April 18, 1933.  E. WILDHABER  1,904,584
TOOL FOR CUTTING GEARS
Filed Oct. 28, 1929  2 Sheets-Sheet 1
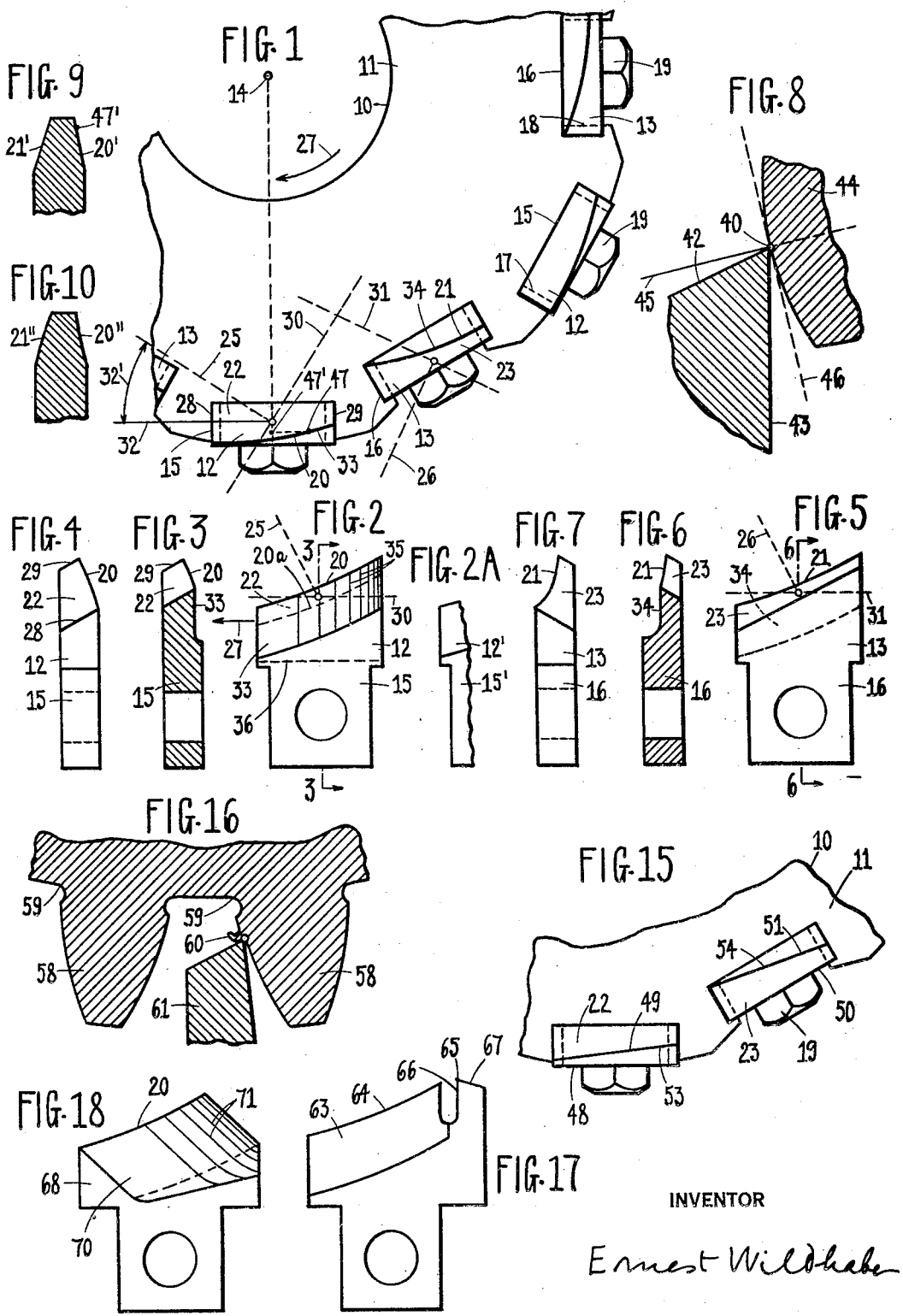
INVENTOR
Ernest Wildhaber April 18, 1933.   E. WILDHABER   1,904,584
TOOL FOR CUTTING GEARS
Filed Oct. 28, 1929   2 Sheets-Sheet 2

INVENTOR
Ernest Wildhaber

Patented Apr. 18, 1933

1,904,584

UNITED STATES PATENT OFFICE

ERNEST WILDHABER, OF BROOKLYN, NEW YORK, ASSIGNOR TO GLEASON WORKS, OF ROCHESTER, NEW YORK, A CORPORATION OF NEW YORK

TOOL FOR CUTTING GEARS

Application filed October 28, 1929. Serial No. 402,988.

The present invention relates to a tool for and method of cutting gears.

One object of the present invention is to devise a gear cutting tool capable of higher cutting speeds than present gear cutting tools. Another object is to provide a gear cutting tool which is less apt to cause chatter or vibrations, and which provides a very smooth cut. Another aim in view is to provide a rotary gear cutting tool of novel character, on which the load sustained in the cutting operation is more even and less changing as successive teeth move into cutting engagement. This feature is known to be important in obtaining a fine finish on the tooth surfaces cut, and it helps to obtain increased accuracy of the teeth, especially when the tools considered are of the hob type.

Further purposes of the present invention are to provide a gear cutting tool whose cutting edges move very gradually into cutting engagement, and to provide a method of cutting gears in a process, where such gradual cutting engagement is effected.

In gear cutting practice it is often experienced that small particles or chips adhere to the cutting faces of the tools and then tend to cause scratches on the finished tooth surfaces. It is also an object of the present invention to provide a remedy for this condition, as will be further described hereafter.

Other objects will appear in the course of the specification and from recital of the appended claims.

A few embodiments of the present invention are illustrated in the accompanying drawings, in which Fig. 1 is a partial plan view of a gear cutting tool of face mill form, constructed in accordance with the present invention.

Fig. 2 is a front view of a cutter blade, such as may be used on a tool of the character illustrated in Fig. 1.

Fig. 2A is a fractional view of a cutter blade adjacent to the blade shown in Fig. 2. Fig. 2A serves to illustrate a novel feature of the blade shown in Fig. 2.

Fig. 3 is a section along lines 3—3 of Fig. 2.

Fig. 4 is a side view of the tool shown in Fig. 2.

Fig. 5 is a front view of another cutter blade, such as may be used on a tool of the general character illustrated in Fig. 1.

Fig. 6 is a section along lines 6—6 of Fig. 5.

Fig. 7 is a side view of the blade shown in Fig. 5.

Fig. 8 is a diagram useful in explaining the present invention.

Fig. 9 and Fig. 10 are diagrammatic sectional views of the cutting profiles of face mills having various types of blades, as referred to hereafter.

Fig. 15 is a partial plan view of a gear cutting tool of face mill form, illustrative of a modification of the present invention.

Fig. 16 is a partial section perpendicular to the direction of the teeth of a gear blank, and comprising a section through a cutting portion in engagement with said teeth.

Fig. 17 is a front view of a cutter blade illustrative of another embodiment of the present invention.

Fig. 18 is a front view of a cutter blade illustrative of still another embodiment of the present invention.

Fig. 24 is a section along lines 24—24 of Fig. 23, said section containing also teeth of a gear blank in engagement with the hob referred to.

Figure 11:
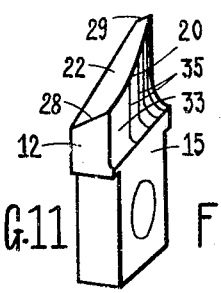
Fig. 11 and Fig. 12 are perspective views of the blades shown in Fig. 2 and in Fig. 5 respectively.

In Fig. 1, numeral 10 denotes a cutter body of disk form, which forms part of a gear cutting tool 11. A plurality of cutting teeth 12, 13 project upwardly from said body, substantially in the direction of the axis 14 of the tool. Cutting teeth 12, 13 are formed by blades 15, 16 inserted in slots 17, 18 provided in cutter body 10 adjacent its periphery. Screws 19 serve for securing said blades 15, 16 to their respective slots 17, 18.

Cutter body and blades constitute a gear cutter of face mill form, such as may be used for instance for producing spiral bevel and hypoid gears.

A blade 15 is further illustrated in Fig. 2, Fig. 3, Fig. 4 and perspective view Fig. 11. It contains an outwardly disposed cutting edge 20, formed by an inclined cutting face 22, which extends from a lower part 28 of cutting tooth 12 upwardly and rearwardly to the top 29 of said cutting tooth. Arrow 27 indicates the direction of rotation of the tool 11. On account of its outwardly disposed cutting edge 20, blade 15 will be hereafter referred to as an outside blade.

Figure 12:
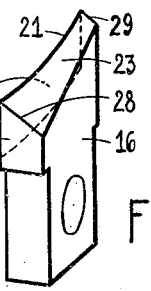

A blade 16, which contains an inwardly disposed cutting edge 21, is further shown in Fig. 5, Fig. 6, Fig. 7 and in perspective view Fig. 12, and will be referred to as an inside blade. Cutting edge 21 is formed by a cutting face 23, which also extends from a lower part of the cutting tooth 13 upwardly and rearwardly to the top of the cutting tooth. The upward direction is hereby and hereafter understood to be the direction, in which the cutting teeth project from the cutter body, and the rearward direction is the direction directly opposite to the direction of the cutting motion relatively to a gear blank.

Inasmuch as the present invention does not refer specifically to blade adjustment or to cutter adjustment, I have omitted to indicate means for adjusting the individual blades or the cutter body as a whole with respect to the axis of rotation, and have tried to confine the drawings to the chief features of the present invention. It is however clearly understood that I do not wish to discard adjustment in practice, and also that I do not wish to confine myself to the use of inserted blades. I may, of course, also use cutting teeth soldered to a cutter body or integral with the cutter body.

In the embodiment illustrated in Fig. 1 to Fig. 7, Fig. 11, Fig. 12, the cutting faces 22, 23 are portions of planes and will be referred to as plane cutting faces. They are angularly disposed with respect to the axis of the cutting tool. The arrangement and inclination of said plane cutting faces is further indicated through normals 25, 26 (Fig. 1, Fig. 2, Fig. 5) at the mean points of the cutting faces 22, 23 respectively. The said normals are perpendicular to the actual cutting faces and are indicated in dotted lines. They extend upwardly and forwardly from their points of intersection with the respective cutting faces. Furthermore intersection lines of the cutting faces with planes perpendicular to the cutter axis are indicated in dotted lines 30, 31 (Fig. 1, Fig. 2, Fig. 5) to further indicate the position of the cutting faces. The cutting faces are seen to face forwardly, in the cutting direction, and upwardly, in the direction in which the cutting teeth project from the cutter body.

The disposition of the cutting faces is one of the novel features of the present invention. In gear cutters of face mill form or of face hob form, the cutting faces hitherto provided extend either in a direction parallel to the cutter axis, and their mean normals then extend forwardly but not upwardly or often the cutting faces hitherto provided are so disposed, that their mean normals extend forwardly and downwardly.

A cutting edge of the hitherto known types of gear cutters moves into the tooth zones of a gear blank substantially at the same time along its whole extent. In other words a whole cutting edge, its upper portion as well as its lower portion, enters a tooth space almost simultaneously. This often means that the cutting action starts simultaneously along the whole cutting edge.

According to the present invention a cutting edge is moved gradually into a tooth space of a gear blank, its lower portion (28) entering said tooth space long before its upper portion (29). Also the cutting action starts gradually, and sudden jerks due to suddenly taking up cutting pressure may be avoided. Furthermore the cutting action of each cutting edge may be distributed over a large arc of rotation of the tool, inasmuch as a cutting edge extends through a considerable angle with respect to the axis of the tool, and inasmuch as therefore some portions of a cutting edge are in the cutting zone, after other portions of the cutting edge have passed through said zone and before other portions have entered said zone.

In accordance with the present invention it is further easily possible to so dispose the cutting edges that a plurality of cutting edges are simultaneously in cutting engagement with a gear blank, and to effect a condition which adds much to the smoothness of the cutting action.

In the preferred embodiments of the present invention the cutting face includes an angle smaller than 60° with the cutting direction, which latter equals the peripheral direction in the case of milling cutters. In other words the mean normal (25 or 26) to a cutting face (22, 23) includes an angle larger than 30° with the cutting direction, on gear cutters formed in accordance with the present invention. Often this angle is larger than 45°. The angle included between mean normal 25 and the cutting direction 32 is shown in projection in Fig. 1 and is denoted with numeral 32'.

The cutting edges 20, 21 are formed as the intersection lines of the cutting faces 22, 23 with relieved side surfaces 33, 34. These latter surfaces extend along straight lines 35, which are parallel to the cutter axis 14, see Fig. 2, and perspective view Fig. 11. In resharpening, the blades are preferably ground on their cutting faces 22, 23. The new cutting faces are identical with the old cutting faces, and are displaced in the direction of the cutter axis as compared with the said old cutting faces. In this process new cutting edges are formed, as indicated by dotted line 20a in Fig. 2. The new cutting edges are identical in shape with the old ones, and, like the cutting faces, are displaced in the direction of the cutter axis with respect to the old cutting edges.

The relieved side surfaces 33, 34 are preferably ground on a new cutter, but they are not reground in the resharpening operation. Now it is to be noted that in relief grinding the side surfaces of the blades it is possible to grind said surfaces while all the blades are inserted in their slots. This is not practically possible in conventional gear cutters for cutting spiral bevel gears and hypoid gears. In relief grinding said conventional cutters, alternate blades have to be removed from their slots, to avoid interference between the grinding wheel and the blades. To relief grind cutters formed in accordance with the present invention, while all the blades are inserted, I preferably move the grinding wheel along the cutting edge, relatively to a cutting tooth of the tool, for instance rearwardly and upwardly. On account of said upward motion, the grinding wheel may be kept clear of a subsequent cutting tooth (12'), see Fig. 2 and Fig. 2A. It is particularly simple to prevent interference, when the grinding wheel is inclined in such a manner that its surface extends in the direction of the cutting edge. In other words the grinding wheel may then be positioned so as to relief grind in the direction of the cutting edge. In Fig. 2A a portion of an outside blade 15' is shown adjacent to outside blade 15 of Fig. 2, and thereby illustrates the condition in a cutter containing only one type of cutting teeth or blades.

Whenever the grinding wheel and a cutting tooth are fed relatively to each other along the cutting edge of said cutting tooth, the relieved side surface (33) will constitute a zone following said cutting edge.

If so desired, the relieved side surfaces (33, Fig. 2) may be made to extend between the cutting edge 20 and a line (36, Fig. 2) contained in a plane perpendicular to the cutter axis. Such a disposition may be considered especially, when the blades are inserted in their slots after relief grinding, for instance when the blades are purchased separately from the cutter body. In this case, that is to say when the blades are to be inserted in the respective slots after relief grinding, the relieved side surfaces 33, 34 are preferably made cylindrical surfaces having a circular profile in a plane perpendicular to the cutter axis.

The cutting action and the disposition of the cutting faces will now be further explained with reference to Fig. 8, which is a section laid perpendicular to a cutting edge 40. The said cutting edge is formed as the intersection between a cutting face 42 and a relieved side surface 43. Cutting edge 40 engages a tooth portion 44 of a gear blank, and for the sake of explanation is supposed to take a very light cut. A tooth normal 45 and a tooth tangent 46 are indicated as a full line and as a dotted line respectively. Normal 45 as well as tangent 46 are supposed to lie in the drawing plane of Fig. 8.

In cutting tools formed in accordance with the present invention, motion between the cutting edge 40 and the adjacent portion 44 of the blank is not solely in the direction of tangent 46, but lengthwise of the cutting edge 40 as well. In other words, cutting edge 40 moves relatively to the blank portion 44 in a direction perpendicular to the drawing plane (Fig. 8), as well as in the direction of tangent 46. The motion lengthwise of the cutting edge, that is to say perpendicular to the drawing plane, does not materially affect the angles to be provided between the cutting face 42, the relieved surface 43, and the tooth normal 45. To obtain a keen cutting action, cutting face 42 should stand back from tooth normal 45, as indicated in Fig. 8, or at least not protrude over it. To obtain cutting clearance or relief, surface 43 should stand back from tangent 46, and include a suitable relief angle with it. Cutting face 42 and side surface 43 then form an acute angle with each other.

The relative motion lengthwise of the cutting edge, which exists as a substantial component of the total motion between the tool and the blank, has the beneficial effect of tending to keep the cutting faces free from particles, which otherwise might adhere to them. The cutting faces are continuously swept clean by the chips themselves.

The cutting edges of a gear cutting tool of face mill form represent a cutting surface, which is a surface of revolution concentric with said tool, as well known. The tooth shapes formed by such a tool depend on the shape of said cutting surface, which may be characterized by the shape of its profile in a plane containing the cutter axis. This profile of the cutting surface is often called the cutting profile of the tool.

It is readily understood that the cutting edges 20, 21 must be such, that they lie in the given cutting surface of the tool, and from this requirement, the cutting edges 20, 21 may be determined with the known means of mathematics. It is frequently desired to provide a tool having a conical outside cutting surface as well as a conical inside cutting surface, for instance a tool having a cutting profile as indicated in Fig. 9, which is composed of a straight outside profile 20' as well as of a straight inside profile 21'. To obtain a point 47 (Fig. 1) of the cutting edge 20, which corresponds to any assumed point 47' of the cutting profile, the distance of the latter point from the cutter axis is first determined. Thereafter the plane perpendicular to the cutter axis is located which contains point 47', and its intersection line with the predetermined cutting face 22 is determined. Point 47 lies on said intersection line, at the same distance from the cutter axis as point 47'. In other words, and referring to Fig. 1, point 47 lies on a circle drawn through point 47' concentric with the tool axis.

If the cutting faces 22, 23 are planes, the cutting edges 20, 21 are found to be curved lines, when they are to correspond to a cutting profile as indicated in Fig. 9. They are then the intersection lines of the conical cutting surfaces with the plane cutting faces. The side surfaces 33, 34 are surfaces, which contain the predetermined cutting edges, and which stand back from the respective cutting surfaces, for instance which stand back from the conical cutting surfaces having cutting profiles as indicated in Fig. 9.

Fig. 10 illustrates curved cutting profiles, consisting of a curved outside profile 20'' and of a curved inside profile 21''. The corresponding cutting edges of the tool and the corresponding relieved side surfaces may be determined as indicated above with reference to cutting profile Fig. 9.

Figure 13:
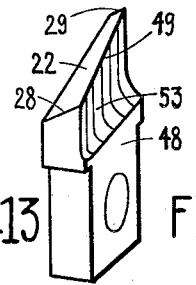
Fig. 13 and Fig. 14 are perspective views of blades of the modification illustrated in Fig. 15.
Figure 14:
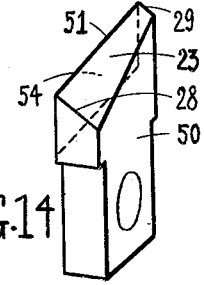

Fig. 10 has the further significance of illustrating a cutting profile, as may be obtained with straight cutting edges disposed in accordance with the present invention. An outside blade 48 containing a straight outside cutting edge 49 is illustrated in perspective view Fig. 13; and an inside blade 50, containing a straight inside cutting edge 51 is shown in perspective view Fig. 14. The arrangement of the blades in the cutter body is similar to the arrangement of Fig. 1, and is illustrated in a partial plan view in Fig. 15. Straight cutting edges 49, 51 may be easily obtained by providing not only plane cutting faces 22, 23, but also plane side surfaces 53, 54, which extend parallel to the cutter axis. Inasmuch as the straight cutting edges 49, 51 are angularly disposed to and offset from the axis of the tool, they describe hyperboloids of revolution when rotated about the axis of the tool, as is readily understood. In other words the cutting surfaces are then hyperboloids of revolution, and the cutting profiles (Fig. 10) are then portions of hyperbolas, which differ however very little from circular arcs on the portions which may be used in practice.

On account of the large obliquity of the cutting faces with respect to the cutting direction, according to the present invention, the stock which is removed by a cutting edge has a tendency to give way upwardly, towards the tooth bottoms of the gear blank. To prevent accumulation of chips at the tooth bottoms, several procedures may be used alternatively.

For instance, the gear may be first rough cut in such a manner, that the extreme roots of the gear teeth are already cut to final size, as indicated in Fig. 16. The teeth 58 are undercut at their roots 59, so that a chip 60 formed in the finishing operation by a cutting portion 61, has no hold on the root of a gear tooth and is therefore removed by the cutting tool. It is understood that the roots 59 do not engage in toothed contact, and that therefore they do not need to be formed with such a high degree of accuracy as the load carrying tooth sides.

Another way of preventing accumulation of chips near the roots of the gear teeth is to provide additional cutting edges, which sweep the tooth roots clean. Fig. 17 illustrates as an example a blade 63, which contains a cutting edge 64 for finishing tooth sides, and another cutting edge 65 for sweeping the tooth roots clean of chips. Cutting edge 65 is formed as the intersection of a cutting face 66 with a relieved surface 67, and is in the illustrated instance perpendicular to the plane of the drawings and projected as a point only. In resharpening, the cutting faces adjacent cutting edge 64, and surface 67 are ground, to effect cutting edges which are displaced with respect to the old cutting edges in the direction of the axis of the tool.

Instead of providing a cutting edge 65 and a side cutting edge 64 on the same blade, I may provide a separate blade for cutting edge 65, if so desired. For instance, I may dispose a blade containing a top cutting edge (65) after every pair of outside and inside blades.

Still another way of preventing accumulation of chips is by taking comparatively light finishing cuts only and by relying on the side cutting edges (20 and 21 in Fig. 1) for keeping the tooth bottoms free from the light chips formed.

Fig. 18 diagrammatically illustrates a modified form of blade or cutting tooth. The outside blade 68 contains a cutting edge 20 of the character described. The adjacent relieved surface 70 here does not extend along lines parallel to the axis of the cutter, but along helices 71 concentric with the axis of the cutter. For convenience the helices are indicated as straight lines in Fig. 18. Relieved surfaces of the helicoidal character of surface 70 may be considered, when the cutter corresponds to a comparatively large pressure angle.

Figure 20:
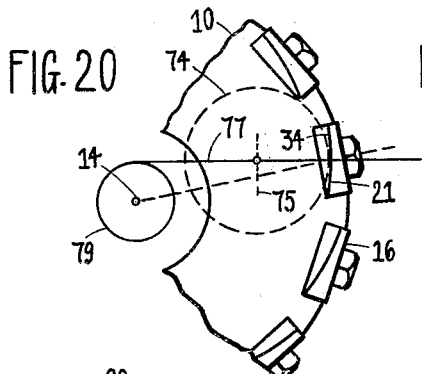
Fig. 19 and Fig. 20 are fractional and diagrammatic plan views illustrative of a way of grinding the relieved outside surfaces and inside surfaces respectively of the cutting teeth.
Figure 19:
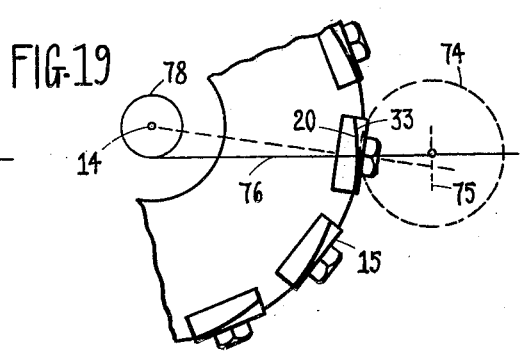

Fig. 19 and Fig. 20 illustrate a way of relief grinding the side surfaces 33, 34 while all the blades are inserted in their slots, or when the cutting teeth are formed integral with the cutter body. The periphery of a grinding wheel is indicated in dotted lines 74. The axis 75 of the grinding wheel may be disposed parallel to the axis 14 of the tool, or often may be so inclined that the grinding surface follows the cutting edge 20, 21 of the cutting tooth engaged in grinding contact. The latter condition is diagrammatically indicated in the drawing, axis 75 being projected as a line extending in a plane parallel to the cutting edge. If so desired, suitable recesses may be provided in cutter body 10, Fig. 20, to safely avoid any interference with an inclined grinding wheel (74).

In the grinding operation, the cutter is rotated relatively to the grinding wheel about the cutter axis, and simultaneously moved in the direction of said axis, and moreover along a straight line 76 or 77, which is tangent to a base circle 78, 79 respectively. The motion in the direction of the cutter axis is required when all the blades are inserted, to keep the grinding wheel clear from cutting teeth subsequent to the cutting tooth which is being ground. Preferably lines 76 and 77 are so determined, that the relieved side surfaces 33, 34 are involute surfaces or approximately involute surfaces.

Figure 21:
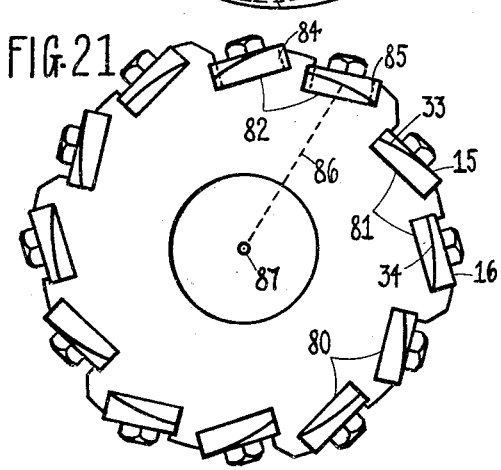
Fig. 21 is a plan view of a face hob for generating gears, constructed in accordance with the present invention.

Fig. 21 illustrates an application of the present invention to gear cutters of the type of face hobs. A face hob of the character indicated in Fig. 21 may be used for producing spiral bevel and hypoid gears, and contains groups 80, 81, 82 of cutting teeth, which in the cutting operation pass through successive tooth spaces of the continuously indexed gear blank.

The disposition of the cutting faces and of the cutting edges with respect to the cutting direction is the same as has been described with respect to the face mill type of gear cutter. The cutting direction does however not fully coincide with the peripheral direction of the tool, as well known. The cutting direction of face hobs may be determined in known manner by superposing on the peripheral velocity of the tool the peripheral velocity of the continuously indexed gear blank. The thereby resulting velocity is the cutting velocity, and its direction is the cutting direction.

One may go even so far as to use the same blades on face hobs as on face mills, if so desired. The blades 15, 16, shown in Fig. 21 are identical with the blades 15, 16 indicated in Fig. 19 and Fig. 20. Only the disposition of the blades relatively to the cutter axis is different. The said different disposition of the blades may be obtained by providing different slots on the cutter body of the face hob, the direction of the slots 84, 85 being inclined to the radial direction 86.

Inasmuch as the relieved side surfaces 33, 34 extend along lines parallel to the cutter axis 87, the cutting edges formed after resharpening remain at exactly the same radial distance from the cutter axis 87. This should be particularly noted, for conventional face hobs lack this quality. In conventional face hobs, a cutting edge formed after resharpening has a different radial distance from the cutter axis than the original cutting edge. To maintain the same cutting action, it has been hitherto necessary to re-adjust all the blades by substantial amounts after sharpening.

From what has been said above, it is evident that the present invention may also be applied to taper hobs and to cylindrical hobs for cutting gears.

Figure 23:
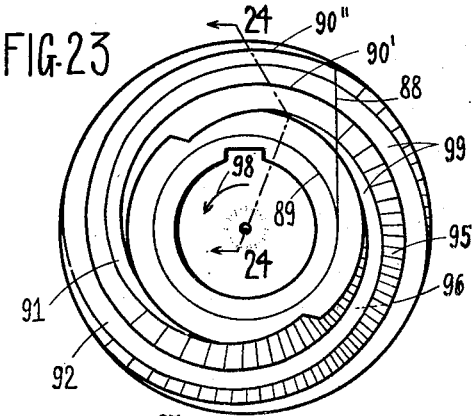
Fig. 23 is an end view of a hob for cutting spur and helical gears, and constructed in accordance with the present invention.
Figure 24:
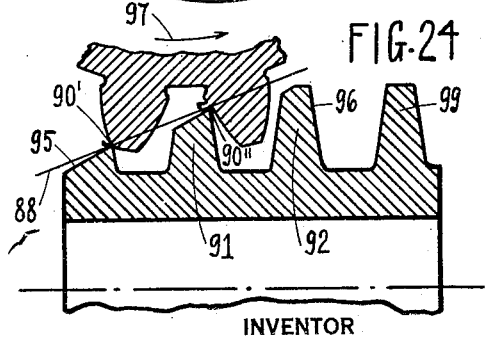

A very simple application of the present invention to hobs for cutting spur gears will now be described with reference to Fig. 22, Fig. 23 and Fig. 24. The illustrated example refers to a hob for cutting involute spur gears and involute helical gears.

The thread surface of known hobs for cutting involute gears is an involute helicoidal surface, as well known. This thread surface, or surface where all the cutting edges are contained, meshes with the finished tooth sides of a gear blank along a straight line of action, which contains all the possible points of contact between said thread surface and the finished tooth sides of the gear blank. Contact is made at one point or at a plurality of separate points at a time, as known.

Figure 22:
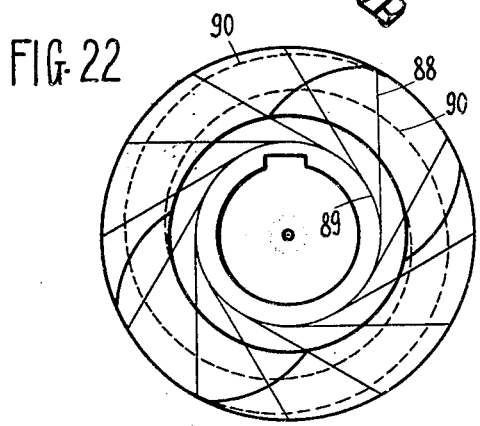
Fig. 22 is an end view of the helicoidal thread of a hob for cutting involute spur and helical gears, illustrative of certain interrelations observed in the embodiment of the invention illustrated in Fig. 23 and Fig. 24.

In the end view Fig. 22 of said thread surface, a line of action appears as a straight line 88 which is tangent to the base circle 89 of the respective involute helicoidal thread surface. The line of action and all the data connected therewith may be determined with the known methods of mathematics.

The line of action 88, which is fixed in space, intersects the respective thread surface in a point which during the rotation of said thread surface moves along said line of action, and in which continuous contact with a finished tooth surface of the gear blank takes place. The said point of contact traces a spiral 90 on the thread surface, which spiral is shown as a dotted line in Fig. 22, inasmuch as the thread side opposite to the observer is considered.

Preferably hobs having multiple threads are used in embodying the present invention. In the instance illustrated two threads 91, 92 are provided.

In accordance with the present invention, cutting edges 90', 90'' (Fig. 23) may be provided which extend along the above said spirals 90, and which thereby embody said spirals. Reference is also made to Fig. 24, which is a sectional view of the hob thread in a plane tangent to the base circle of the hob and parallel to the hob axis. The cutting edges are formed by cutting faces 95 and relieved side surfaces 96. The cutting faces (95) as well as the side surfaces (96) may be made helicoidal surfaces having straight profiles in the section Fig. 24. The lead of the surfaces 95 and of the surfaces 96 is so determined, that in the sectional view Fig. 24 the straight profile of the cutting faces 95 intersects the straight profile of side surfaces 96 in points of line of action 88. The direction of rotation of the blank is indicated by arrow 97 and the direction of rotation of the hob by arrow 98, see Fig. 23, which is an end view of a hob viewed from the side of its tapered end.

It is noted that the cutting edges 90', 90'' as well as the cutting faces extend rearwardly and upwardly on the cutting portions or threads 99, and that the normals to the cutting faces include angles larger than 30° with the cutting direction, which latter is the direction of the unrelieved or full hob threads.

A hob is placed in such position relatively to a gear blank, that it meshes along line of action 88 with the finished tooth sides of said gear blank. A hob as just described may finish one side of the teeth of a gear blank at a time. It may be used for finishing both sides of a gear blank successively, by resetting the blank or the hob, as is readily understood. For quantity production preferably a plurality of hobs are made to act simultaneously on a plurality of gear blanks, and known means are provided for readily resetting the blanks.

Hobs of the character described contain no individual cutting teeth proper, as formed by flutes on conventional hobs. Their curved cutting edges remain in continuous cutting contact with a gear blank until a whole tooth profile has been gradually finished. It is readily understood, that the cutting action is very smooth and that the hobs can be run at very high speed while maintaining high accuracy. Also it is clearly seen that the illustrated hobs and other tools constructed in accordance with the present invention are very simple and that they can be readily ground all over.

Tools constructed according to the present invention may be provided with cutting portions of hard cutting material, such as for instance Carboloy and Widia. The gradual cutting engagement of tools constructed according to the present invention tends to prevent damage of said materials, even at the highest desirable speeds.

Various further modifications and changes may be made in my invention by simply applying the established knowledge and customary practice of the art, and without departing from the spirit of my invention. For definition of its scope reliance is placed on the appended claims.

What I claim is:

1. A rotary gear cutting tool, containing a tool body, a cutting portion projecting from said tool body, a cutting face forming a cutting edge on said cutting portion, said cutting edge extending from a lower part of said cutting portion upwardly and rearwardly towards the top of said cutting portion, and said cutting face having a general inclination so as to face forwardly and upwardly.

2. A rotary gear cutting tool, containing a tool body, a cutting portion projecting from said tool body, a cutting face forming a cutting edge on said cutting portion, said cutting edge extending from a lower part of said cutting portion upwardly and rearwardly to the top of said cutting portion, and the elements of said cutting face being inclined to the direction of the axis of said tool.

3. A rotary gear cutting tool, containing a tool body, a cutting portion projecting from said tool body, a curved side surface disposed on said cutting portion, a cutting face forming a cutting edge with said side surface, said cutting edge extending from a lower part of said cutting portion upwardly and rearwardly to the top of said cutting portion, and said cutting face having a general inclination so as to face forwardly and upwardly.

4. A rotary gear cutting tool, containing a tool body, a plurality of equal cutting teeth projecting upwardly from said tool body substantially in the direction of the axis of said tool, cutting faces forming cutting edges on said cutting teeth, said cutting faces being inclined with respect to the direction of the axis of said tool and facing forwardly and upwardly, the heights of the cutting-teeth increasing from front to rear.

5. A rotary gear cutting tool, containing a tool body of disk form, a plurality of cutting teeth projecting upwardly from said tool body substantially in the direction of the axis of said tool, cutting faces forming curved cutting edges on said cutting teeth, said cutting faces being inclined with respect to the axis of said tool and facing forwardly and upwardly, the heights of the blades increasing from front to rear.

6. A rotary gear cutting tool, containing a tool body, a plurality of cutting teeth projecting upwardly from said tool body substantially in the direction of the axis of said tool, relieved side surfaces provided on said cutting teeth, plane cutting faces forming acute angles with said side surfaces and facing forwardly and upwardly, the heights of the teeth increasing from front to rear, said cutting faces forming cutting edges with said side surfaces.

7. A rotary gear cutting tool, containing a tool body, a plurality of cutting teeth projecting from said tool body substantially in the direction of the axis of said tool, the outer faces of which are formed to provide cutting faces and the side surfaces of which are of increasing height from front to rear and are relieved and form with said top faces cutting edges, said side surfaces extending along lines parallel to the axis of said tool.

8. A rotary gear cutting tool, containing a tool body, a plurality of cutting teeth projecting from said tool body substantially in the direction of the axis of said tool, the outer faces of which are formed to provide cutting faces and the side surfaces of which are of increasing height from front to rear and are relieved and form with said top faces cutting edges, said side surfaces extending along lines parallel to the axis of said tool and having a curved profile in a plane perpendicular to said axis.

9. A rotary gear cutting tool, containing a tool body, a plurality of cutting teeth projecting upwardly from said tool body substantially in the direction of the axis of said tool, cutting faces and relieved side surfaces provided on said cutting teeth and forming cutting edges, said cutting edges and side surfaces extending upwardly and rearwardly to a highest point disposed adjacent the rear end of said cutting teeth.

10. A rotary gear cutting tool, containing a tool body, a plurality of cutting teeth projecting upwardly from said tool body substantially in the direction of the axis of said tool, plane cutting faces and relieved side surfaces of curved profile provided on said cutting teeth and forming cutting edges, said cutting faces extending from a lower portion of said cutting teeth upwardly and rearwardly to the top of said cutting teeth and said side surfaces extending along lines parallel to the axis of said cutting tool.

11. A rotary gear cutting tool, containing a tool body, a plurality of cutting portions projecting from said body, cutting faces forming cutting edges on said cutting portions, the normals of a cutting face including average angles larger than thirty degrees with the cutting direction, and said cutting edges extending from a lower part of said cutting portions upwardly and rearwardly towards the top of said cutting portions.

12. A gear cutter blade for face mills and face hobs, comprising a cutting tooth, a projection suited to be secured to a cutter head, a cutting edge formed on said cutting tooth by a cutting face and a side surface, the mean normal of said cutting face extending upwardly, away from said projection, and forwardly, in the cutting direction.

13. A gear cutter blade for face mills and face hobs, comprising a cutting tooth, a projection suited to be secured to a cutter head, a cutting edge formed on said cutting tooth by a plane cutting face and a side surface, the normals of said cutting face extending upwardly, away from said projection, and forwardly, in the cutting direction.

14. A gear cutter blade having a cutting portion, the height of which increases from front to rear, and the outer face of which forms a cutting face and is inclined at an acute angle to one of its side faces to form a cutting edge.

15. A gear cutter blade having a cutting portion, the height of which increases from front to rear, the outer face of said cutting portion being plane and forming a cutting face and being inclined at an acute angle to one of the side faces of said cutting portion to form a cutting edge.

16. A gear cutter blade having a cutting portion, the height of which increases from front to rear, said cutting portion having an outer face which forms a cutting face and having curved side faces relieved from front to rear.

17. A gear cutter blade having a cutting portion, the height of which increases from front to rear, said cutting portion having an outer face which forms a cutting face and having curved side faces forming parts of cylindrical surfaces.

18. A gear cutter comprising a rotary head and a plurality of cutting blades secured to said head, each of said blades having a cutting edge and side surfaces relieved from front to rear, the relieved surfaces of each blade lying between its cutting edge and a plane perpendicular to the axis of the cutter head.

19. A gear cutter comprising a rotary head and a plurality of annularly arranged cutting blades secured thereto, each of said blades having a cutting portion, the height of which increases from front to rear, said cutting portions having an outer face which forms a cutting face and is inclined at an acute angle to one of its side faces to form a cutting edge.

20. A gear cutter comprising a rotary head and a plurality of annularly arranged cutting blades secured thereto, each of said blades having a cutting portion, the height of which increases from front to rear, the outer face of said cutting portion being plane and forming a cutting surface and the sides of said cutting portions being curved and relieved from front to rear.

21. A gear cutter comprising a rotary head and a plurality of annularly arranged cutting blades secured thereto, each of said blades having a cutting portion, the height of which increases from front to rear, the outer face of said cutting portion being plane and forming a cutting surface and the sides of said cutting portion forming parts of cylindrical surfaces curved about axes parallel to the axis of the head.

ERNEST WILDHABER.